USOO5550966A

United States Patent [19]

Drake et al.

[11] Patent Number: 5,550,966
[45] Date of Patent: Aug. 27, 1996

[54] AUTOMATED PRESENTATION CAPTURE, STORAGE AND PLAYBACK SYSTEM

[75] Inventors: Samuel Drake; Allan D. Griefer, both of San Jose; John T. Powers, Jr., Morgan Hill; John G. Thomas, Santa Cruz, all of Calif.

[73] Assignee: International Business Machines Corporation, Armonk, N.Y.

[21] Appl. No.: 365,339

[22] Filed: Dec. 28, 1994

Related U.S. Application Data

[63] Continuation of Ser. No. 874,441, Apr. 27, 1992, abandoned.

[51] Int. Cl.$^6$ .................................................. G06T 13/00
[52] U.S. Cl. ........................ 395/154; 395/152; 395/153
[58] Field of Search ................................. 395/152, 153, 395/154; 364/419.19

[56] References Cited

U.S. PATENT DOCUMENTS

| | | | |
|---|---|---|---|
| 4,025,722 | 5/1977 | Karron | 179/1 |
| 4,437,127 | 3/1984 | Hirose | 364/419.19 |
| 4,553,206 | 11/1985 | Smutek et al. | 364/300 |
| 4,641,253 | 2/1987 | Mastran | 364/518 |
| 4,677,570 | 6/1987 | Taki | 364/518 |
| 4,791,496 | 12/1988 | Kageyama et al. | 358/342 |
| 4,805,134 | 2/1989 | Calo et al. | 395/161 |
| 4,893,256 | 1/1990 | Rutherfoord | 364/518 |
| 4,905,094 | 2/1990 | Pocock et al. | 395/154 |
| 4,924,303 | 5/1990 | Brandon et al. | 358/86 |
| 4,924,387 | 5/1990 | Jeppesen | 364/409 |
| 4,939,594 | 12/1990 | Moxon et al. | 360/14.1 |
| 4,951,155 | 8/1990 | Andrews | 358/342 |
| 4,958,297 | 9/1990 | Hansen | 395/154 |
| 4,979,050 | 12/3199 | Westland et al. | 360/14.1 |
| 5,148,154 | 9/1992 | Mackay et al. | 395/154 |
| 5,237,648 | 8/1993 | Mills et al. | 395/152 |
| 5,274,758 | 12/1993 | Beitel et al. | 395/154 |

OTHER PUBLICATIONS

Poor, "Turnkey Multimedia From IBM", PC Magazine, vol. 9 No. 9 (May 15, 1990), pp. 157–169.
"Electromic Library Systems", The Seybold Report on Publishing Systems, vol. 18 Nos. 19–20 (Jul. 19, 1989) pp. 62–63.
Yi, "MediaMaker", MacUser, vol. 7 No. 12. (Dec. 1991), pp. 72–74.
Phillipo, "Videodisc Technology and HyperCard: A combination that Can't Be Beat".
Ripley, "DVI–A Digital Multimedia Technology", Communications of the ACM, vol. 32 No. 7 (Jul. 1989), pp. 811–822.

(List continued on next page.)

*Primary Examiner*—Heather R. Herndon
*Assistant Examiner*—Stephen Hong
*Attorney, Agent, or Firm*—Baker, Maxham, Jester & Meador

[57] ABSTRACT

A video input device senses a visual portion of a presentation and produces video signal information corresponding to the visual portion. A user interface is provided for inputting presentation identification information relating to a presentation. The audio signal information, video signal information and presentation identification information are stored as a presentation set. The system further includes a presentation management portion in communication with the presentation capture portion. The presentation management portion includes a character recognition device for generating text character information from the presentation set video signal information and adding the text character information to the set. The presentation set is stored in a database that includes a database indexing system for generating an index of text character information from the presentation set, and a database search program for searching the index for selected information contained therein. The presentation playback portion includes an input query system for formulating and directing search requests to the database search program. An output display device displays search results following a search request. Based on the search results, users can selectively replay a presentation set from the database.

1 Claim, 3 Drawing Sheets

OTHER PUBLICATIONS

Johnstone, "Second Look: AV Online—An Early File Revitalized", Database, vol. 8 No. 2 (Jun. 1985) pp. 55–58.

Stone, "Royal Recovery Systems Inc.: Instant Image Talk Workstation System", PC Magazine, vol. 6 No. 14 (Aug. 1987), pp. 371–373.

P. D. Welch, "System for Integrating and Collating Audio and Text, and for Text Creation and Editing", IBM Technical Disclosure Bulletin, vol. 16, No. 2 (Jul. 1973) pp. 500–503.

K. L. Jeffries et al. "Audio Editor System", IBM Technical Disclosure Bulletin, vol. 30, No. 12 (May 1988), pp. 358–359.

5,550,966

AUTOMATED PRESENTATION CAPTURE, STORAGE AND PLAYBACK SYSTEM

This application is a continuation of application Ser. No. 07/874,441, filed Apr. 27, 1992, now abandoned.

BACKGROUND OF THE INVENTION

The present invention pertains to an automated system for capturing, storing, indexing and replaying audio/visual presentations. Relatedly, the present invention is concerned with the provision of a system for creating and maintaining a presentation library which can be utilized as an educational database for selectively displaying live presentations captured in recorded form.

In business and educational settings, much time is spent in attending lectures, tutorials and other presentations. Much time is also spent preparing and presenting such tutorials and presentations. Unfortunately, many people attend presentations which turn out to be of little value to them. Conversely, many people also miss presentations that are of vital importance. Presenters of education and background materials may thus expend much effort covering the same material multiple times. Accordingly, an automated system for capturing, indexing, storing and playing back presentations would provide significant value in many such environments.

SUMMARY OF THE INVENTION

The present invention is directed to an automated system for the capture, management and playback of a presentation having audio and visual information components. In a preferred embodiment, there is provided a presentation capture system including an audio input device for sensing an audio portion of a presentation and for producing audio signal information corresponding to the audio portion. A video input device senses a visual portion of a presentation and produces video signal information corresponding to the visual portion. A user input is provided for inputting presentation identification information relating to a presentation. The audio signal information, video signal information and identification information are stored as a presentation set.

In another aspect of the invention, a presentation management system is provided in communication with the presentation capture system. The presentation management system includes a character recognition device for generating text character information from the presentation set video signal information and adding the text character information to the presentation set. The presentation set is stored in a database that includes a database indexing system for generating an index of text character information from the presentation set, and a database search program for searching the index for selected information contained therein.

In a still further aspect of the invention, a presentation playback system is provided in communication with the presentation management system. The presentation playback system includes an input query interface for formulating and directing search requests to the database search program. An output display device displays search results following a search request. Based on the search results, users can selectively replay a presentation set from the database. The audio information is directed to an audio reproduction device and the video information is output to a video reproduction device.

BRIEF DESCRIPTION OF THE DRAWINGS

FIG. 2b is a second portion of the flow diagram of FIG. 2a.

DETAILED DESCRIPTION OF THE PREFERRED EMBODIMENT

Figure 1:
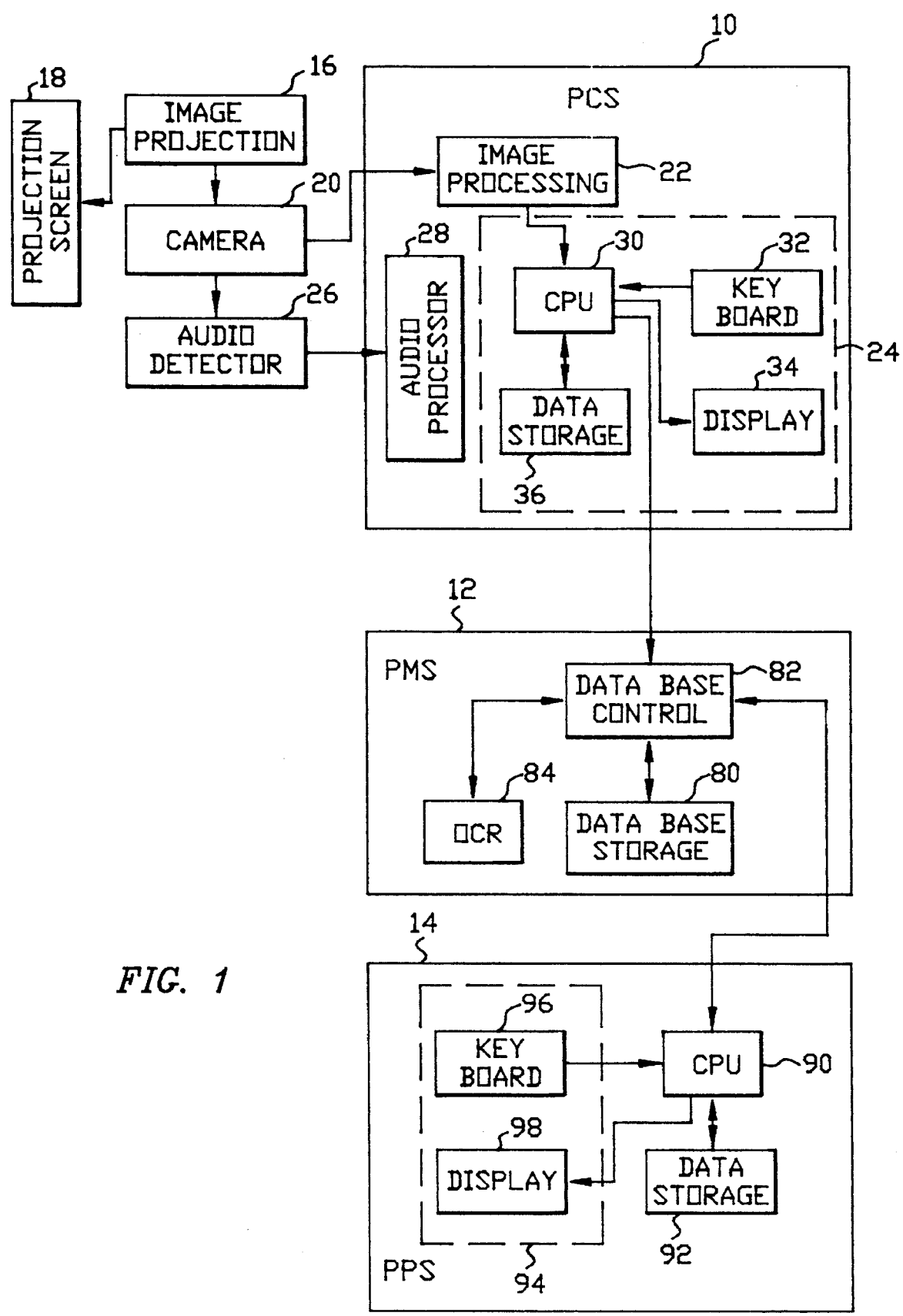
FIG. 1 is a block diagram illustrating an automated presentation capture, management and playback system constructed in accordance with the present invention.

Referring now to FIG. 1, an automated presentation capture, management and playback system includes a presentation capture component 10, a presentation management component 12 and a presentation playback component 14. These systems may be combined within a single data processing device such as a personal computer, a work station, or any other suitable data processing system. They could also be embodied in discrete data processing devices. For example, it may be desirable in many cases to provide the presentation capture system 10 as a separate data processing device such as a personal computer or PC which can be transported to or permanently installed at a presentation situs. In that configuration, the presentation capture system 10 would store presentation data and the data would thereafter be transferred to a separate data processing device including the presentation management system 12 and, if desired, the presentation playback system 14. It may also be desirable to implement the presentation management system 12 as a data processing server device that communicates with the presentation playback system 14. For example, the presentation management system 12 could be a personal computer, or perhaps a mid-range or main frame computer system connected to the presentation playback system 14 in a networking arrangement. The presentation playback component 14 could have local processing capability or could be a dumb terminal. Many other implementations and embodiments will no doubt also be apparent to persons skilled in the art in light of the teachings herein.

It is envisioned that the presentation capture system 10 will be provided at a presentation situs such as conference room, an auditorium or a similar space. A typical presentation will include a speaker, i.e., a "live" presenter, who will use an overhead image projector 16 to display "foils" or "view graphs" to assist in describing the presentation subject matter. The overhead projector 16 projects a view foil image onto a projection screen 18. The view foil image will typically include alpha numeric character text and perhaps diagrams, charts and other graphics. The presentation capture system 10 utilizes a television or high resolution still camera which is aimed at a view graph display area of the image projector 16 to capture video images of the view foil supported on the image projector. An interface electronics module 22 including an analog to digital (A/D) converter processes the video images frames from the camera and presents them in digital form to a computer 24, which includes appropriate volatile memory for buffering plural video frames. The presentation capture system 10 captures the audio component of the presentation, i.e., the narrative accompanying display of the view foils, through a microphone or other suitable audio detection device 26 positioned to pick up the voice of the presenter. Interface electronics 28, including an A/D converter, are provided to digitize the audio signal from the microphone 26 and present it to the computer 24.

The computer 24 is conventional in nature and includes a CPU 30, an input system including a keyboard 32, an output system including a video display device 34, and a data storage resource 36, which is preferably a direct access storage device such as a magnetic disk or optical storage system. In a preferred embodiment, it is contemplated that the computer 24 will be provided as a conventional personal computer or PC. Advantageously, in this configuration, commercially available adaptor cards designed to be physically mounted in bus communication slots provided in all PCs, can be utilized as electronics modules 22 and 28 for converting video and audio information into respective data sequences having machine-readable formats which can be processed, indexed, stored and retrieved as discussed below.

Figure 2A:
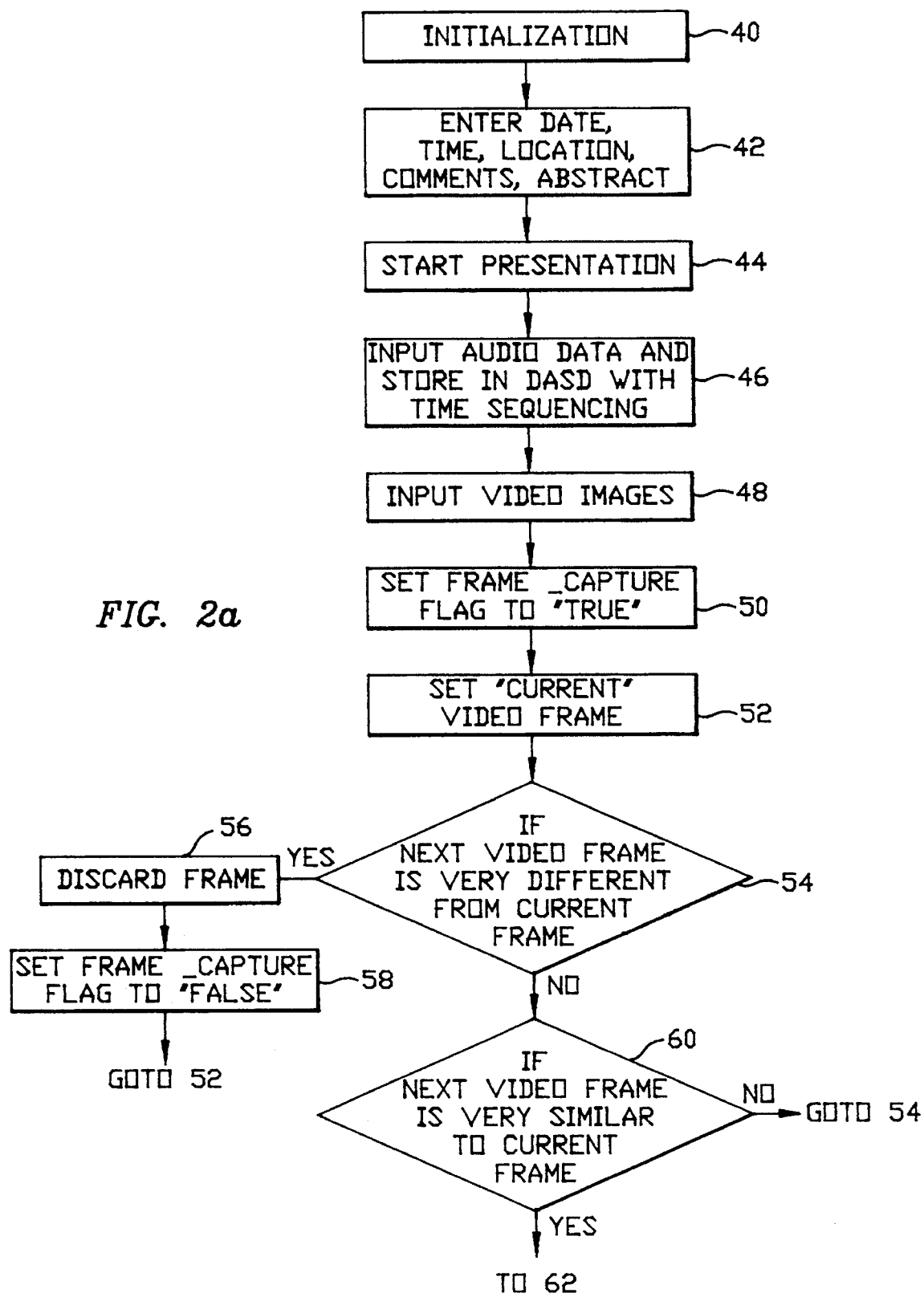
FIG. 2a is a first portion of a flow diagram illustrating the operation of a presentation capture portion of the system of FIG. 1.
Figure 2B:
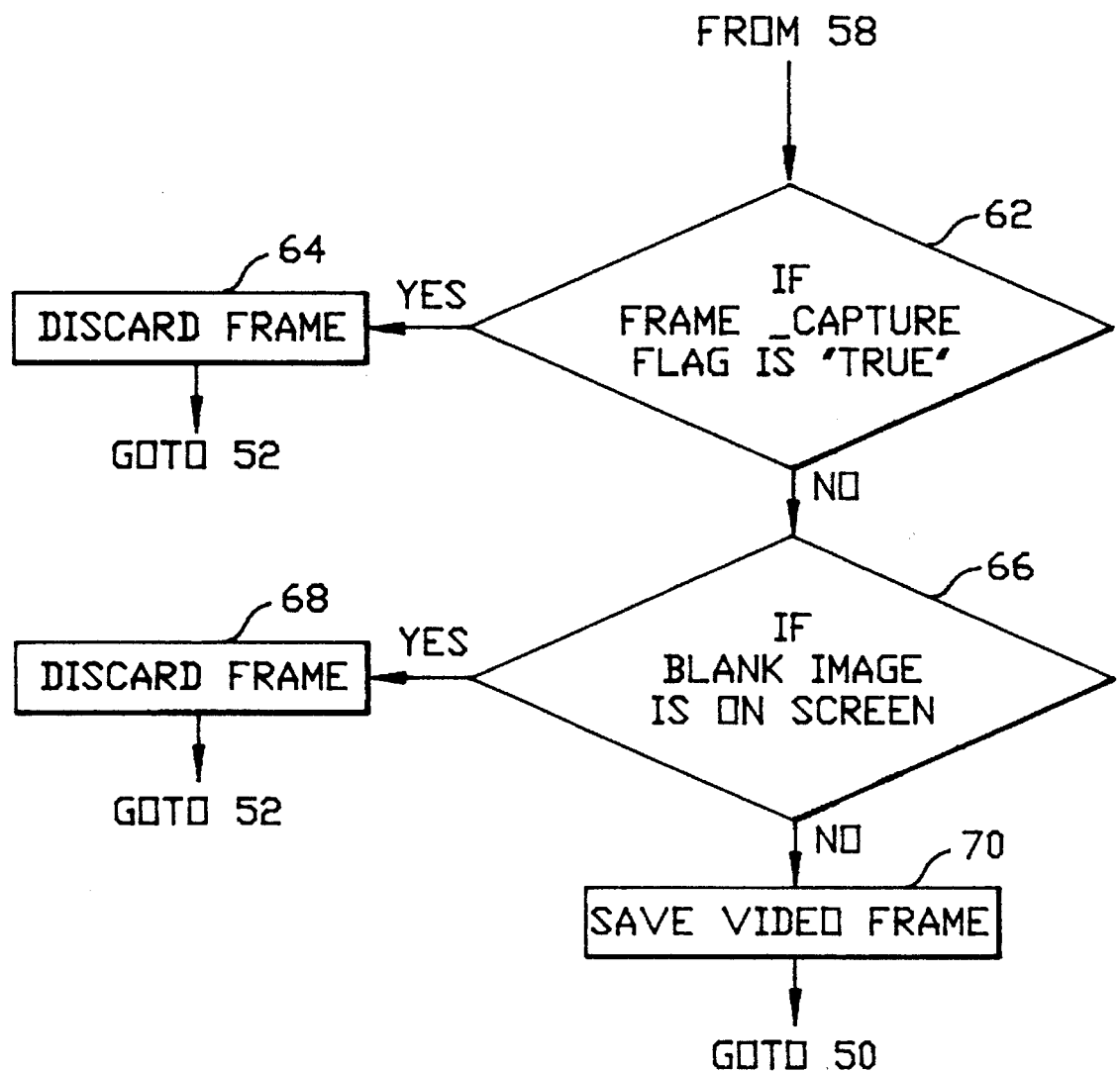

Operation of the presentation capture system 10 will now be described with additional reference being made to the flow diagram of FIG. 2. In a first process step 40, performed prior to the commencement of a presentation, the computer capture system 24 is powered up and its systems are initialized by an operating system of conventional design. Execution of a presentation capture software program is also commenced. The presentation capture program creates a data structure for organizing information generated from the presentation in a presentation data set. In process step 42, when the presentation capture program is ready to receive data, a prompt is generated in the video display device 34 requesting an operator to input identification information concerning the presentation, such as the date, time and location of the presentation, as well as comments about the presentation and perhaps a descriptive abstract thereof, if such information is known in advance. Optionally, the capability of inputting this information could also be offered at the end of a presentation or, indeed at an even later date via the presentation management and playback systems 12 and 14. Input fields are preferably provided in the video display 34 to allow an operator to input presentation information via the keyboard 32.

When a presentation commences, the operator inputs a start command through the keyboard 32 in step 44 of the presentation capture process. In process step 46, the presentation capture program inputs audio signal information from the audio processor 28 and stores the information in the data storage resource 36. This information is stored in memory addresses corresponding to an elapsed time from the presentation start point. Thus, the audio information can be retrieved by specifying a memory address offset value corresponding to an elapsed presentation time value. In step 48, the presentation capture program inputs successive video frames into volatile memory contained within the computer 24. In most cases, not all of the video frames need to be stored. In fact, only a single video image of each presentation view foil is necessary in order to properly capture the video portion of a view foil presentation. The presentation capture program thus processes the input video frames in order to preserve the view foil images it requires while discarding unnecessary video frames.

In step 50, a FRAME_CAPTURE flag is set to "TRUE". In process step 52, the presentation capture program sets a first video frame as a "current" video image. In step 54, the presentation capture program tests the "next" video frame to determine if it is very different from the "current" frame. If it is, then a first view foil is in all likelihood, in the process of being placed on the overhead projector 16. In that case, the presentation capture program proceeds to step 56 where it discards the "next" video frame and then proceeds to step 58 where the FRAME_CAPTURE flag is set to "FALSE". The program then loops back to decision step 54 and subsequent "next" video frames are tested in like fashion via the loop formed by process steps 52, 54, 56 and 58.

If a first view foil has not been placed on the overhead projector 16, a series of blank video images will result until the first view foil is positioned for display. As successive blank video images are input, the decision step 54 will be driven to a false decision output indicating that the frames are not very different from each other. The process then proceeds to decision step 60. In decision step 60, the presentation capture program tests to determine whether the "next" video image frame is very similar to the "current" frame. If it is not, the program returns to step 54 and the video frame is retested to determine if it is very different from the "current" frame. If the result of the test of step 60 reveals that the "next" video frame is very similar to the "current" frame, the presentation capture program proceeds to step 62 to determine if the frame capture flag is set to TRUE. If it is, this means that the video image has not changed and that no view foil has been placed in a display position. In order to avoid the generation of duplicate blank frames, each "next" frame is discarded in step 64. Thus, the initial blank video frames preceding placement of the first view foil will all be discarded.

As indicated, when the first view foil is placed in the display area, a series of very different video images will be presented. This will cause the FRAME_CAPTURE flag to be set to FALSE, and the presentation capture program will loop through process steps 52, 54, 56 and 58. Once the first view foil is completely positioned, and stationary, step 54 of the program will produce a false result, and step 60 will produce a true result. In step 62, the FRAME_CAPTURE flag FALSE state will cause the program to proceed to step 66. In step 66, the presence of a blank screen image is tested. The result will be false due to the fact that the first view foil is now positioned in the display area and the program will proceed to step 70 in order to save the video frame as a first viewfoil image.

Because only a single view foil image is required, the program must discard subsequent images of the same view foil. It does this by returning to process step 50 to reset the FRAME_CAPTURE flag to TRUE. Each "next" video frame which is not very different and is very similar to the saved view foil image, as determined in steps 54 and 60, is then discarded via steps 62 and 64. Looping between steps 52, 54, 60, 62 and 64 continues until the first view foil is removed from the display area.

Video images changes caused by the removal of a view foil cause the program to loop through process steps 52, 54, 56 and 58. The FRAME_CAPTURE flag is set to FALSE. Following removal of the view foil, a series of blank screen images are presented. Upon receiving successive "current" and "next" blank images, the program proceeds to step 66 and the blank "next" frame is discarded in step 68. The program then loops between steps 52, 54, 60, 62, 66 and 68 until a new view foil is placed in the display area, whereupon the procedure outlined above is repeated.

Like the audio signal information, the video signal information is stored in the data storage resource 36 in a manner corresponding to an elapsed time from presentation commencement, such that the video image information representing the first display of each view foil can be retrieved from data storage by specifying an address offset value corresponding to an elapse time value.

Returning now to FIG. 1, and as previously described, the presentation management system 12 may be provided from any number of a conventional computer systems including a personal computer, or a mid-range or main frame system. In all cases, however, the presentation management system 12 should have sufficient memory capacity and processing capability to support a database system including a database storage device 80 and a database control program 82 of conventional design. The presentation management apparatus 12 receives presentation sets from the presentation capture system 10, including audio and image (video) data streams consisting of captured audio and captured video images, respectively, of a presentation. The presentation management system 12 stores each presentation set in the database storage 80, along with presentation sets from other presentations. In this regard, each presentation set is arranged by the database control program into a presentation object which is stored in a presentation database with other presentation objects. In the presentation database, the stored objects are indexed by date, time, location, comments, abstract and keywords.

The database control program 82 preferably includes searching algorithms for retrieving presentation set data in accordance with specified search criteria. For example, the database control program 82 should provide descriptive word search capability for searching key words contained in the character text portions of presentation view graphs, for one or more presentations. In addition, information added to the presentation set by an operator, i.e., presentation date, time and location information, as well as comments and presentation abstract information should also be searchable.

In order to facilitate descriptive word searches for view graph character sets, the presentation management system 12 preferably includes an optical character recognition (OCR) program 84. The OCR program 84 is set up to extract character text information from the video signal information contained in incoming presentation sets and to store the character text information in appropriate format, for example, as an ASCII character set. The text character set generated by the OCR program 84 is incorporated in the stored presentation set in correlation with the video images corresponding thereto. Thus, each presentation set stored in the database 80 includes a data structure having plural data fields containing captured audio, captured view foil images, date, time and location of the presentation, a full text ASCII representation of all view graphs in the presentation, and may further include a descriptive abstract and presentation comments which would be stored in ASCII format.

It is significant that the full ASCII text associated with each view foil is stored in correlation with the associated view foil, which in turn, is correlated with the audio data in a sequential time-based storage mode. This allows ASCII text portions to be identified via database searching, and corresponding video and audio sequences to be retrieved therewith.

In order to facilitate descriptive word searching, the database control program 82 utilizes the character text information generated by the OCR program 84 to construct a full text presentation index. This index contains the full view foil text for one or more presentations stored in the database 80. It could also include ASCII comments and presentation abstracts. In this manner, multiple presentation sets can be searched at multiple levels. Resultantly, using a global index for all presentations, a user can specify at least the following items in queries:

1. date of presentation (exact or range).
2. time of presentation (exact or range).
3. location of presentation (exact).
4. one or more key words that may appear in the abstract of the presentation.
5. one or more key words that may appear in view graphs in the presentation.
6. one or more key words that may appear in comments in the presentation.

Upon receipt of a search request for one or more levels of the above information, the tutorial control program would generate a list of presentations matching the search criteria specified by the user. It will be appreciated that numerous database systems are commercially available that could be readily adapted by persons skilled in the art to provide the foregoing search capability.

Access to and control of the presentation management system 12 is preferably provided through a presentation playback system 14, which may be provided by a processing device configured in a network arrangement with the presentation management system 12. The presentation playback system 14 could also be a dumb terminal connected to the presentation management system. In FIG. 1, the presentation playback system 14 consists of an intelligent terminal including a CPU 90, a data storage resource 92, and a user interface 94 provided by a keyboard 96, a video display device 98, an audio output device 100 and appropriate interface control software. The presentation playback system 14 is programmed to allow users to present search queries to the presentation management system 12 through the user interface 94. Thus, the user interface allows the user to query the index of presentations maintained by the presentation management system 12. The query request is passed to the presentation management system, which returns a list of catalogued presentations matching the search criteria.

Via the user interface 94, the user may select one of the matching presentations to cause the selected presentation to be replayed. When replay is requested, the contents of a presentation set are output to the presentation playback system 14, where they may be placed in the data store 92. A presentation playback program provided in the presentation playback system 14, or possibly in the presentation management system 12 itself, controls the presentation of information. Normally, the presentation playback software will cause the audio segment of a presentation to be played in its entirety, with image and ASCII representations of each view graph appearing on the display 98 at the appropriate point. The presentation playback software preferably provides users the ability to cause the playback to be stopped and the playback to begin from a particular point. The user should also be able to display view graphs without audio. Alternatively, the user should be able to control the presentation, with audio, to resume from any given view graph. Optionally, the user should be permitted to add comments and information abstracts to the presentation and cause these comments to be catalogued by the presentation management system 12. And, if the user is suitably authorized, the user should be able to revise the presentation; for example, by automatically deleting redundant images from the presentation or correcting mistakes made during the OCR process. Persons skilled in the art appreciate that appropriate playback control software for providing the foregoing playback control functionality could be implemented in routine fashion in light of the teachings herein.

Accordingly, a presentation capture, management and playback system has been disclosed wherein live presentations can be captured, stored in a database and retrieved upon request for playback. Although a preferred embodiment of the invention has been shown and described, it will be understood that modifications and adaptations thereof will occur to persons skilled in the art. For example, the presentation management system could be modified so that if ASCII text of presented view graphs is available, it will only be necessary to use OCR in order to determine when the view graph was displayed so that the ASCII text can be correlated to the time at which the video image appears in the presentation. If high resolution video images of the presented view graphs are available, OCR could be applied to the high resolution images. The high resolution images could be correlated with the images captured from the screen in order to determine when each view graph was displayed. Some implementations might not use OCR at all, requiring a human editor to perform this function. Others might provide "computer-assisted" editing with the computer OCR serving as the starting place for a human editor. Still, others might rely entirely on computerized capture and OCR, with no manual editing at all.

Therefore, the protection afforded the invention should not be limited except in accordance with the spirit of the following claims and their equivalents.

We claim:

1. An automated system for the capture, management and playback of a presentation given by a live speaker having audio and visual information components, comprising:

a live presentation capture system, including:

audio input means for sensing an audio portion of a live presentation and for producing audio signal information corresponding to said audio portion;

video input means for sensing a visual portion of said live presentation and for producing video signal information corresponding to said visual portion;

user input means for permitting a user to manually input presentation identification information relating to said live presentation; and processing means connected to the audio, video and user input means for converting said audio signal information, video signal information and presentation identification information to machine-readable format in the form of, respectively, an audio data stream, a video data stream and presentation identification data, said processing means including storage means for receiving said audio signal information and said video signal information upon conversion to machine-readable format and for assembling said audio data stream and said video data stream, respectively, by storage in a sequence of storage locations whose addresses correspond to elapsed times from a presentation start point included in said presentation identification data, said processing means further including video processing means for identifying selected portions of said video data stream to be stored in said storage means, said video data stream corresponding to a series of static video presentation images and said video processing means including means for preventing storage of said video data stream corresponding to transitions between said static video presentation images;

a presentation management system coupled to said presentation capture system, including:

a presentation database;

means for receiving said audio and video data streams and said presentation identification data;

means for combining the received audio and video data streams into a single presentation object and indexing that presentation object by said presentation identification data;

means for storing said presentation object with other presentation objects in said presentation database; and means for retrieving said presentation object from said presentation database in response to a search request including index data contained in said presentation identification data;

a presentation playback system coupled to said presentation management system, including:

query means connected to said presentation management system for providing a search request including index data;

output interface means for displaying search results including presentation management system responses to said search request;

replay request means for selecting a presentation object from said search results;

audio output means for outputting audio information from a selected presentation object; and video output means for outputting video information in response to said selected presentation object.

* * * * *